United States Patent [19]

Hauser et al.

[11] Patent Number: 5,983,260
[45] Date of Patent: Nov. 9, 1999

[54] SERIAL CONTROL AND DATA INTERCONNECTS FOR COUPLING AN I/O MODULE WITH A SWITCH FABRIC IN A SWITCH

[75] Inventors: Stephen A. Hauser, Burlington; Stephen A. Caldara, Sudbury; Thomas A. Manning, Northboro; Robert B. McClure, Hollis, all of Mass.

[73] Assignees: Fujitsu Network Communications, Inc., Richardson, Tex.; Fujitsu Limited, Kawasaki, Japan

[21] Appl. No.: 08/683,792

[22] Filed: Jul. 18, 1996

Related U.S. Application Data

[60] Provisional application No. 60/001,498, Jul. 29, 1995.
[51] Int. Cl.⁶ .............................. G06F 13/00; G06F 13/20
[52] U.S. Cl. ..................... 709/201; 370/381; 370/412; 370/229; 370/902; 455/560; 455/78
[58] Field of Search .................. 295/200.31; 455/78, 455/560; 370/381, 412, 229, 230, 902

[56] References Cited

U.S. PATENT DOCUMENTS

| | | | |
|---|---|---|---|
| 3,804,991 | 4/1974 | Hammond et al. | 179/26 |
| 3,974,343 | 8/1976 | Cheney et al. | 179/18 ES |
| 4,069,399 | 1/1978 | Barrett et al. | 179/15 AL |
| 4,084,228 | 4/1978 | Dufond et al. | 364/200 |
| 4,240,143 | 12/1980 | Bessemer et al. | 364/200 |
| 4,603,382 | 7/1986 | Cole et al. | 364/200 |
| 4,715,030 | 12/1987 | Koch et al. | 370/85 |
| 4,727,537 | 2/1988 | Nichols | 370/85 |
| 4,737,953 | 4/1988 | Koch et al. | 370/94 |
| 4,748,658 | 5/1988 | Gopal et al. | 379/221 |
| 4,797,881 | 1/1989 | Ben-Artzi | 370/88 |
| 4,821,034 | 4/1989 | Anderson et al. | 340/825.8 |
| 4,837,761 | 6/1989 | Isono et al. | 370/60 |

(List continued on next page.)

FOREIGN PATENT DOCUMENTS 484943  3/1992  Japan .

OTHER PUBLICATIONS

Rob Coltun et al., PRP: A P–NNI Routing Protocol Proposal, ATM Forum Technical Committee, ATM–Forum/94–0492, Apr. 28, 1994.

Richard Bubenik et al., Leaf Initiated Join Extensions, ATM Forum Technical Committee, Signalling Subworking Group, ATM Forum 94–0325, Apr. 28, 1994.

Richard Bubenik et al., Requirements For Phase 2 Signaling Protocol, ATM Forum Technical Committee, Signalling Subworking Group, ATM Forum 94–1078, Jan. 1, 1994.

H.T. Kung and K. Chang, Receiver–Oriented Adaptive Buffer Allocation in Credit–Based Flow Control for ATM Networks, Proceedings of INFOCOM '95, Apr. 2–6, 1995, pp. 1–14.

H.T. Kung et al., Credit–Based Flow Control for ATM Networks: Credit Update Protocol, Adaptive Credit Allocation, and Statistical Multiplexing, Proceedings of ACM SIGCOMM '94 Symposium on Communications Architectures, Protocols and Applications, Aug. 31–Sep. 2, 1994, pp. 1–14.

(List continued on next page.)

*Primary Examiner*—Thomas C. Lee
*Assistant Examiner*—Rehana Perveen
*Attorney, Agent, or Firm*—Weingarten, Schurgin, Gagnebin & Hayes LLP

[57] ABSTRACT

A communication device (10) includes a number of input/output modules (12) coupled to a switch control module (14) using an interconnect (40) and to a redundant switch control module (16) using a redundant interconnect (42). Each interconnect (40) and redundant interconnect (42) includes a control interconnect (44) and a data interconnect (46). The control interconnect (44) establishes control information for transferring a cell in the communication device (10) and the data interconnect (46) performs the cell transfer.

80 Claims, 5 Drawing Sheets

U.S. PATENT DOCUMENTS

| | | | |
|---|---|---|---|
| 4,849,968 | 7/1989 | Turner | 370/94 |
| 4,870,641 | 9/1989 | Pattavina | 370/60 |
| 4,872,157 | 10/1989 | Hemmady et al. | 370/60 |
| 4,872,159 | 10/1989 | Hemmady et al. | 370/60 |
| 4,872,160 | 10/1989 | Hemmady et al. | 370/60 |
| 4,872,197 | 10/1989 | Pemmaraju | 379/93 |
| 4,878,216 | 10/1989 | Yunoki | 370/60 |
| 4,893,302 | 1/1990 | Hemmady et al. | 370/60 |
| 4,893,307 | 1/1990 | McKay et al. | 370/94.1 |
| 4,894,824 | 1/1990 | Hemmady et al. | 370/58.3 |
| 4,897,833 | 1/1990 | Kent et al. | 370/85.2 |
| 4,897,841 | 1/1990 | Gang, Jr. | 370/479 |
| 4,899,333 | 2/1990 | Roediger | 370/60 |
| 4,920,531 | 4/1990 | Isono et al. | 370/60 |
| 4,922,503 | 5/1990 | Leone | 370/85.13 |
| 4,933,938 | 6/1990 | Sheehy | 370/85.13 |
| 4,942,574 | 7/1990 | Zelle | 370/85.15 |
| 4,947,390 | 8/1990 | Sheehy | 370/85.13 |
| 4,953,157 | 8/1990 | Franklin et al. | 370/60 |
| 4,956,839 | 9/1990 | Torii et al. | 370/60 |
| 4,958,341 | 9/1990 | Hemmady et al. | 370/60.1 |
| 4,979,100 | 12/1990 | Makris et al. | 364/200 |
| 4,993,018 | 2/1991 | Hajikano et al. | 370/60 |
| 5,014,192 | 5/1991 | Mansfield et al. | 364/200 |
| 5,021,949 | 6/1991 | Morten et al. | 364/200 |
| 5,029,164 | 7/1991 | Goldstein et al. | 370/95.1 |
| 5,060,228 | 10/1991 | Tsutsui et al. | 370/85.13 |
| 5,067,123 | 11/1991 | Hyodo et al. | 370/58.1 |
| 5,070,498 | 12/1991 | Kakuma et al. | 370/60 |
| 5,083,269 | 1/1992 | Syobatake et al. | 395/425 |
| 5,084,867 | 1/1992 | Tachibana et al. | 370/60 |
| 5,084,871 | 1/1992 | Carn et al. | 370/94.1 |
| 5,090,011 | 2/1992 | Fukuta et al. | 370/60 |
| 5,090,024 | 2/1992 | Vander Mey et al. | 375/1 |
| 5,093,827 | 3/1992 | Franklin et al. | 370/60.1 |
| 5,093,912 | 3/1992 | Dong et al. | 395/650 |
| 5,115,429 | 5/1992 | Hluchyj et al. | 370/84 |
| 5,119,369 | 6/1992 | Tanabe et al. | 370/60 |
| 5,119,372 | 6/1992 | Verbeek | 370/85.3 |
| 5,128,932 | 7/1992 | Li | 370/60 |
| 5,130,975 | 7/1992 | Akata | 370/60 |
| 5,130,982 | 7/1992 | Ash et al. | 370/85.7 |
| 5,132,966 | 7/1992 | Hayano et al. | 370/79 |
| 5,146,474 | 9/1992 | Nagler et al. | 375/10 |
| 5,146,560 | 9/1992 | Goldberg et al. | 395/200 |
| 5,146,587 | 9/1992 | Francisco | 395/575 |
| 5,150,358 | 9/1992 | Punj et al. | 370/84 |
| 5,151,897 | 9/1992 | Suzuki | 370/85.13 |
| 5,157,657 | 10/1992 | Potter et al. | 370/85 |
| 5,163,045 | 11/1992 | Caram et al. | 370/60.1 |
| 5,163,046 | 11/1992 | Hahne et al. | 370/79 |
| 5,179,556 | 1/1993 | Turner | 370/94.1 |
| 5,179,558 | 1/1993 | Thacker et al. | 370/94.3 |
| 5,185,743 | 2/1993 | Murayama et al. | 370/110.1 |
| 5,191,578 | 3/1993 | Lee | 370/63 |
| 5,191,582 | 3/1993 | Upp | 370/94.1 |
| 5,191,652 | 3/1993 | Dias et al. | 395/200 |
| 5,193,151 | 3/1993 | Jain | 395/200 |
| 5,197,067 | 3/1993 | Fujimoto et al. | 370/94.1 |
| 5,198,808 | 3/1993 | Kudo | 340/825.8 |
| 5,199,027 | 3/1993 | Barri | 370/60 |
| 5,239,539 | 8/1993 | Uchida et al. | 370/58.3 |
| 5,253,247 | 10/1993 | Hirose et al. | 370/14 |
| 5,253,248 | 10/1993 | Dravida et al. | 370/16 |
| 5,255,264 | 10/1993 | Cotton et al. | 370/24 |
| 5,255,266 | 10/1993 | Watanabe et al. | 370/60.1 |
| 5,257,311 | 10/1993 | Naito et al. | 380/48 |
| 5,258,979 | 11/1993 | Oomuro et al. | 370/95.1 |
| 5,265,088 | 11/1993 | Takigawa et al. | 370/15 |
| 5,267,232 | 11/1993 | Katsube et al. | 370/17 |
| 5,268,897 | 12/1993 | Komine et al. | 370/60 |
| 5,271,010 | 12/1993 | Miyake et al. | 370/94.1 |
| 5,272,697 | 12/1993 | Fraser et al. | 370/61 |
| 5,274,641 | 12/1993 | Shobatake et al. | 370/94.1 |
| 5,274,768 | 12/1993 | Traw et al. | 395/275 |
| 5,280,469 | 1/1994 | Taniguchi et al. | 370/13 |
| 5,280,470 | 1/1994 | Buhrke et al. | 370/13 |
| 5,282,201 | 1/1994 | Frank et al. | 370/94.1 |
| 5,283,788 | 2/1994 | Morita et al. | 370/110.1 |
| 5,285,446 | 2/1994 | Yonehara | 370/60.1 |
| 5,287,349 | 2/1994 | Hyodo et al. | 370/60.1 |
| 5,287,535 | 2/1994 | Sakagawa et al. | 370/60 |
| 5,289,462 | 2/1994 | Ahmadi et al. | 370/60.1 |
| 5,289,463 | 2/1994 | Mobasser | 370/68.1 |
| 5,289,470 | 2/1994 | Chang et al. | 370/94.1 |
| 5,291,481 | 3/1994 | Doshi et al. | 370/79 |
| 5,291,482 | 3/1994 | McHarg et al. | 370/60 |
| 5,295,134 | 3/1994 | Yoshimura et al. | 370/16 |
| 5,301,055 | 4/1994 | Bagchi et al. | 359/139 |
| 5,301,184 | 4/1994 | Uriu et al. | 370/60 |
| 5,301,190 | 4/1994 | Tsukuda et al. | 370/66 |
| 5,301,193 | 4/1994 | Toyofuku et al. | 370/94.1 |
| 5,303,232 | 4/1994 | Faulk, Jr. | 370/530 |
| 5,305,311 | 4/1994 | Lyles | 370/60 |
| 5,309,431 | 5/1994 | Tominaga et al. | 370/60 |
| 5,309,438 | 5/1994 | Nakajima | 370/94.1 |
| 5,311,586 | 5/1994 | Bogart et al. | 379/221 |
| 5,313,454 | 5/1994 | Bustini et al. | 370/13 |
| 5,313,458 | 5/1994 | Suzuki | 370/56 |
| 5,315,586 | 5/1994 | Charvillat | 370/60 |
| 5,319,638 | 6/1994 | Lin | 370/60 |
| 5,321,695 | 6/1994 | Proctor et al. | 370/530 |
| 5,323,389 | 6/1994 | Bitz et al. | 370/60.1 |
| 5,333,131 | 7/1994 | Tanabe et al. | 370/54 |
| 5,333,134 | 7/1994 | Ishibashi et al. | 370/94.1 |
| 5,335,222 | 8/1994 | Kamoi et al. | 370/60 |
| 5,335,325 | 8/1994 | Frank et al. | 395/200 |
| 5,339,310 | 8/1994 | Taniguchi | 370/60 |
| 5,339,317 | 8/1994 | Tanaka et al. | 370/85.15 |
| 5,339,318 | 8/1994 | Tanaka et al. | 370/110.1 |
| 5,341,366 | 8/1994 | Soumiya et al. | 370/17 |
| 5,341,373 | 8/1994 | Ishibashi et al. | 370/85.9 |
| 5,341,376 | 8/1994 | Yamashita | 370/99 |
| 5,341,483 | 8/1994 | Frank et al. | 395/400 |
| 5,345,229 | 9/1994 | Olnowich et al. | 340/825.8 |
| 5,350,906 | 9/1994 | Brody et al. | 235/379 |
| 5,355,372 | 10/1994 | Sengupta et al. | 370/60 |
| 5,357,506 | 10/1994 | Sugawara | 370/60 |
| 5,357,507 | 10/1994 | Hughes et al. | 370/60 |
| 5,357,508 | 10/1994 | Le Boudec et al. | 370/58.3 |
| 5,357,510 | 10/1994 | Norizuki et al. | 370/60.1 |
| 5,359,600 | 10/1994 | Ueda et al. | 370/60.1 |
| 5,361,251 | 11/1994 | Aihara et al. | 370/60 |
| 5,361,372 | 11/1994 | Rege et al. | 395/800 |
| 5,363,433 | 11/1994 | Isono | 379/92 |
| 5,363,497 | 11/1994 | Baker et al. | 395/425 |
| 5,365,514 | 11/1994 | Hershey et al. | 370/17 |
| 5,369,570 | 11/1994 | Parad | 364/401 |
| 5,371,893 | 12/1994 | Price et al. | 395/725 |
| 5,373,504 | 12/1994 | Tanaka et al. | 370/60.1 |
| 5,375,117 | 12/1994 | Morita et al. | 370/79 |
| 5,377,262 | 12/1994 | Bales et al. | 379/220 |
| 5,377,327 | 12/1994 | Jain et al. | 395/200 |
| 5,379,297 | 1/1995 | Glover et al. | 370/60.1 |
| 5,379,418 | 1/1995 | Shimazaki et al. | 395/575 |
| 5,390,174 | 2/1995 | Jugel | 370/60 |
| 5,390,175 | 2/1995 | Hiller et al. | 370/60 |
| 5,392,280 | 2/1995 | Zheng | 370/60 |
| 5,392,402 | 2/1995 | Robrock, II | 395/200 |

| | | | |
|---|---|---|---|
| 5,394,396 | 2/1995 | Yoshimura et al. | 370/60 |
| 5,394,397 | 2/1995 | Yanagi et al. | 370/60.1 |
| 5,396,491 | 3/1995 | Newman | 370/60 |
| 5,398,235 | 3/1995 | Tsuzuki et al. | 370/16 |
| 5,400,337 | 3/1995 | Munter | 370/60.1 |
| 5,402,415 | 3/1995 | Turner | 370/60 |
| 5,412,648 | 5/1995 | Fan | 370/60 |
| 5,414,703 | 5/1995 | Sakaue et al. | 370/60 |
| 5,418,942 | 5/1995 | Krawchuk et al. | 395/600 |
| 5,420,858 | 5/1995 | Marshall et al. | 370/60.1 |
| 5,420,988 | 5/1995 | Elliott | 395/275 |
| 5,422,879 | 6/1995 | Parsons et al. | 370/60 |
| 5,425,021 | 6/1995 | Derby et al. | 370/54 |
| 5,425,026 | 6/1995 | Mori | 370/60 |
| 5,426,635 | 6/1995 | Mitra et la. | 370/60 |
| 5,432,713 | 7/1995 | Takeo et al. | 364/514 |
| 5,432,784 | 7/1995 | Ozveren | 370/79 |
| 5,432,785 | 7/1995 | Ahmed et al. | 370/79 |
| 5,432,908 | 7/1995 | Heddes et al. | 395/250 |
| 5,436,886 | 7/1995 | McGill | 370/16 |
| 5,436,893 | 7/1995 | Barnett | 370/60.1 |
| 5,440,547 | 8/1995 | Easki et al. | 370/60 |
| 5,444,702 | 8/1995 | Burnett et al. | 370/60.1 |
| 5,446,733 | 8/1995 | Tsuruoka | 370/60.1 |
| 5,446,737 | 8/1995 | Cidon et al. | 370/85.5 |
| 5,446,738 | 8/1995 | Kim et al. | 370/94.2 |
| 5,448,559 | 9/1995 | Hayter et al. | 370/60.1 |
| 5,448,621 | 9/1995 | Knudsen | 379/58 |
| 5,450,406 | 9/1995 | Esaki et al. | 370/60.1 |
| 5,452,296 | 9/1995 | Shimizu | 370/60.1 |
| 5,454,299 | 10/1995 | Thessin et al. | 370/62 |
| 5,455,820 | 10/1995 | Yamada | 370/17 |
| 5,455,825 | 10/1995 | Lauer et al. | 370/60 |
| 5,457,687 | 10/1995 | Newman | 370/85.3 |
| 5,459,743 | 10/1995 | Fukuda et al. | 371/67.1 |
| 5,461,611 | 10/1995 | Drake, Jr. et al. | 370/54 |
| 5,463,620 | 10/1995 | Sriram | 370/60 |
| 5,463,629 | 10/1995 | Ko | 370/110.1 |
| 5,463,775 | 10/1995 | DeWitt et al. | 395/184.01 |
| 5,465,331 | 11/1995 | Yang et al. | 395/200 |
| 5,465,365 | 11/1995 | Winterbottom | 395/600 |
| 5,469,003 | 11/1995 | Kean | 326/39 |
| 5,473,608 | 12/1995 | Gagne et al. | 370/85.13 |
| 5,475,679 | 12/1995 | Mjnter | 370/58.2 |
| 5,479,401 | 12/1995 | Bitz et al. | 370/60.1 |
| 5,479,402 | 12/1995 | Hata et al. | 370/60.1 |
| 5,483,526 | 1/1996 | Ben-Nun et al. | 370/60.1 |
| 5,485,453 | 1/1996 | Wahlman et al. | 370/16 |
| 5,485,455 | 1/1996 | Dobbins et al. | 370/60 |
| 5,487,063 | 1/1996 | Kakuma et al. | 370/56 |
| 5,488,606 | 1/1996 | Kakuma et al. | 370/16 |
| 5,491,691 | 2/1996 | Shtayer et al. | 370/61 |
| 5,491,694 | 2/1996 | Oliver et al. | 370/85.4 |
| 5,493,566 | 2/1996 | Ljungberg et al. | 370/60 |
| 5,497,369 | 3/1996 | Wainwright | 370/60 |
| 5,499,238 | 3/1996 | Shon | 3570/60.2 |
| 5,504,741 | 4/1996 | Yamanaka et al. | 370/58.2 |
| 5,504,742 | 4/1996 | Kakuma et al. | 370/60.1 |
| 5,506,834 | 4/1996 | Sekihata et al. | 370/17 |
| 5,506,839 | 4/1996 | Hatta | 370/60 |
| 5,506,956 | 4/1996 | Cohen | 395/182.04 |
| 5,509,001 | 4/1996 | Tachibana et al. | 370/17 |
| 5,509,007 | 4/1996 | Takashima et al. | 370/60.1 |
| 5,513,134 | 4/1996 | Cooperman et al. | 365/49 |
| 5,513,178 | 4/1996 | Tanaka | 370/58.2 |
| 5,513,180 | 4/1996 | Miyake et al. | 370/60.1 |
| 5,515,359 | 5/1996 | Zheng | 370/13 |
| 5,517,495 | 5/1996 | Lund et al. | 370/60 |
| 5,519,690 | 5/1996 | Suzuka et al. | 370/17 |
| 5,521,905 | 5/1996 | Oda et al. | 370/17 |
| 5,521,915 | 5/1996 | Dieudonne et al. | 370/60.1 |
| 5,521,916 | 5/1996 | Choudhury et al. | 370/60.1 |
| 5,521,917 | 5/1996 | Watanabe et al. | 370/1 |
| 5,521,923 | 5/1996 | Willmann et al. | 370/94.1 |
| 5,523,999 | 6/1996 | Takano et al. | 370/58.2 |
| 5,524,113 | 6/1996 | Gaddis | 370/60.1 |
| 5,526,344 | 6/1996 | Diaz et al. | 370/16 |
| 5,528,588 | 6/1996 | Bennett et al. | 370/60 |
| 5,528,590 | 6/1996 | Iidaka et al. | 370/60.1 |
| 5,528,591 | 6/1996 | Lauer | 370/79 |
| 5,530,695 | 6/1996 | Digne et al. | 370/17 |
| 5,533,009 | 7/1996 | Chen | 370/17 |
| 5,533,020 | 7/1996 | Byrn et al. | 370/60.1 |
| 5,535,196 | 7/1996 | Aihara et al. | 370/60 |
| 5,535,197 | 7/1996 | Cotton | 370/60 |
| 5,537,394 | 7/1996 | Abe et al. | 370/17 |
| 5,541,912 | 7/1996 | Choudhury et al. | 370/17 |
| 5,544,168 | 8/1996 | Jeffrey et al. | 370/60.1 |
| 5,544,169 | 8/1996 | Norizuki et al. | 370/60.1 |
| 5,544,170 | 8/1996 | Kasahara | 370/84 |
| 5,546,389 | 8/1996 | Wippenbeck et al. | 370/60 |
| 5,546,391 | 8/1996 | Hochschild et al. | 370/60 |
| 5,546,392 | 8/1996 | Boal et al. | 370/60.1 |
| 5,550,821 | 8/1996 | Akiyoshi | 370/60.1 |
| 5,550,823 | 8/1996 | Irie et al. | 370/60.1 |
| 5,553,057 | 9/1996 | Nakayama | 370/13 |
| 5,553,068 | 9/1996 | Aso et al. | 370/60 |
| 5,555,243 | 9/1996 | Kakuma et al. | 370/58.2 |
| 5,555,265 | 9/1996 | Kakuma et al. | 370/60 |
| 5,557,607 | 9/1996 | Holden | 370/58.2 |
| 5,568,479 | 10/1996 | Watanabe et al. | 370/60.1 |
| 5,570,361 | 10/1996 | Norizuki et al. | 370/60.1 |
| 5,570,362 | 10/1996 | Nishimura | 370/60.1 |
| 5,572,522 | 11/1996 | Calamvokis et al. | 370/60.1 |
| 5,577,032 | 11/1996 | Sone et al. | 370/58.3 |
| 5,577,035 | 11/1996 | Hayter et al. | 370/60 |
| 5,577,204 | 11/1996 | Brewer et al. | 395/200.01 |
| 5,583,857 | 12/1996 | Soumiya et al. | 370/233 |
| 5,583,858 | 12/1996 | Hanaoka | 370/392 |
| 5,583,861 | 12/1996 | Holden | 370/395 |
| 5,590,132 | 12/1996 | Ishibashi et al. | 370/236 |
| 5,602,829 | 2/1997 | Nie et al. | 370/235 |
| 5,610,913 | 3/1997 | Tomonaga et al. | 370/219 |
| 5,623,405 | 4/1997 | Isono | 395/230 |
| 5,625,846 | 4/1997 | Kobayakawa et al. | 395/872 |
| 5,633,861 | 5/1997 | Hanson et al. | 370/232 |
| 5,703,875 | 12/1997 | Burnett | 370/381 |

OTHER PUBLICATIONS

An Ascom Timeplex White Paper, Meeting Critical Requirements with Scalable Enterprise Networking Solutions Based on a Unified ATM Foundation, pp. 1–12, Apr. 1994.–Apr. 1995?

Douglas H. Hunt, ATM Traffic Management—Another Perspective, Business Communications Review, Jul. 1994.

Richard Bubenik et al., Leaf Initiated Join Extensions, Technical Committee, Signalling Subworking Group, ATM Forum/94–0325R1, Jul. 1, 1994.

Douglas H. Hunt et al., Flow Controlled Virtual Connections Proposal for ATM Traffic Management (Revision R2), Traffic Management Subworking Group, ATM Forum/94–0632R2, Aug. 1994.

Flavio Bonomi et al., The Rate–Based Flow Control Framework for the Available Bit Rate ATM Service, IEEE Network, Mar./Apr. 1995, pp. 25–39.

R. Jain, Myths About Congestion Management in High Speed Networks, Internetworking Research and Experience, vol. 3, 101–113 (1992).

Douglas H. Hunt et al., Credit–Based FCVC Proposal for ATM Traffic Management (Revision R1), ATM Forum Technical Committee Traffic Management Subworking Group, ATM–Forum/94–0168R1, Apr. 28, 1994.

Douglas H. Hunt et al., Action Item Status for Credit–Based FCVC Proposal, ATM Forum Technical Committee Traffic Management Subworking Group, ATM–Forum/94–0439, Apr. 28, 1994.

Timothy P. Donahue et al., Arguments in Favor of Continuing Phase 1 as the Initial ATM Forum P–NNI Routing Protocol Implementation, ATM Forum Technical Committee, ATM Forum/94–0460, Apr. 28, 1994.

Richard Bubenick et al., Leaf Initiated Join Extensions, Technical Committee, Signalling Subworking Group, ATM Forum/94–0325, Apr. 28, 1994.

SERIAL CONTROL AND DATA INTERCONNECTS FOR COUPLING AN I/O MODULE WITH A SWITCH FABRIC IN A SWITCH

RELATED APPLICATIONS

This application claims the benefit of United States Provisional Application Ser. No. 60/001,498, filed Jul. 19, 1995.

TECHNICAL FIELD OF THE INVENTION

This invention relates generally to communication systems, and more specifically to a serial control and data interconnect.

BACKGROUND OF THE INVENTION

A communication system includes a collection of components that communicate, manipulate, and process information in a variety of ways. The system may support different access technologies, such as frame relay, circuit services, and new and evolving connection-based or connectionless services, that communicate information, such as data, voice, and video. Switches in the communication system employ hardware and software to route information generated by access technologies to an intended destination. In an integrated services network, switches may route information among access technologies in a unified manner.

With an increasing demand for more sophisticated and higher bandwidth communication, switches in a communication system must be scalable and adaptable to the particular needs of the users. Also, switches should support existing access technologies, and provide a flexible framework for new and evolving services.

Existing switches in an integrated services environment suffer from several disadvantages. Switches fail to be modular and scalable to adapt, for example, to the needs and resources of a small private network serving hundreds of users, as well as a larger public network serving tens of thousands of users. Often, switches only support one or a few number of access technologies and offer limited expansion capabilities. Also, as integrated services networks get larger and more complex, existing switches may fail to provide adequate redundancy and fault isolation.

SUMMARY OF THE INVENTION

In accordance with the present invention, the disadvantages and problems associated with switches in a communication system has been substantially reduced or eliminated. In particular, a communication device routes information generated by a variety of access technologies, and includes serial control and data interconnects among its modules to provide modularity, scalability, redundancy, and improved fault isolation.

In accordance with one embodiment of the present invention, a communication device includes a switch control module having a switch fabric and a number of input/output modules having cell flow processors. Control interconnects couple cell flow processors of the input/output modules to the switch fabric of the switch control module. Data interconnects couple cell flow processors of the input/output modules to the switch fabric of the switch control module.

Important technical advantages of the present invention include an architecture of a communication device that provides modularity, scalability, redundancy, and improved fault isolation. In particular, a communication device includes a switch control module coupled to a number of input/output modules using control and data interconnects that operate in a serial fashion to reduce connection complexity and size. In a specific implementation, each input/output module is coupled to a switch control module using a dedicated seven-line serial control interconnect and a dedicated four-line serial data interconnect. This connectivity scheme avoids the complexity, inefficiency, and increased cost of a common or shared bus architecture, while supporting additional input/output modules. A redundant switch control module can also couple to the input/output modules for increased reliability. The serial control and data interconnects improve fault isolation through parity checking. Other technical advantages are readily apparent to one skilled in the art from the following figures, descriptions, and claims.

BRIEF DESCRIPTION OF THE DRAWINGS

For a more complete understanding of the present invention, and for further features and advantages, reference is now made to the following written description taken in conjunction with the accompanying drawings, in which.

DETAILED DESCRIPTION OF THE INVENTION

Figure 1:
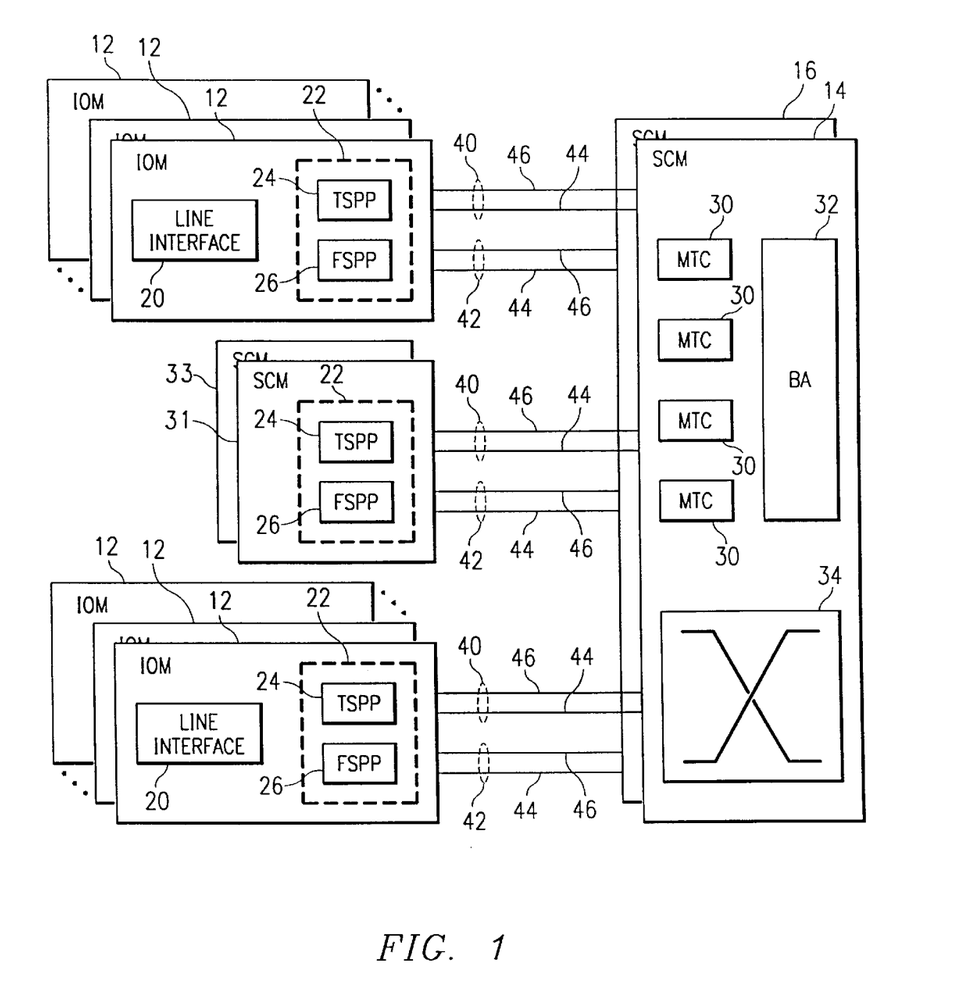
FIG. 1 illustrates a communication device.

FIG. 1 illustrates a communication device 10 that includes a plurality of input/output modules (IOMs) 12 coupled to a switch control module (SCM) 14. In a particular embodiment, a redundant SCM 16 is also coupled to IOMs 12. In operation, IOMs 12 receive information, such as voice, video, and data, using a variety of access technologies. This information is passed to SCM 14 and routed through a selected IOM 12 to an intended destination.

Each IOM 12 includes zero or more line interfaces 20 and a cell flow processor 22 having a to-switch port processor (TSPP) 24 and a from-switch port processor (FSPP) 26. In one embodiment, line interface 20 includes a connectivity engine, network interworking, and physical interface to receive data from and provide data to a variety of access technologies. For example, line interface 20 may support asynchronous transfer mode (ATM) cell relay (OC-12, OC-3c, 155 Mbps UTP), frame relay (T1, E1, T3, E3, V.35), circuit emulation (T1, E1, T3, E3), internetworking using Ethernet, Fast Ethernet, Internet Protocol (IP), or IP over ATM, or any other communications protocol or access technology. Communication device 10 contemplates line interface 20 that supports any suitable communication technique, whether connection-based or connectionless.

The structure and function of line interface 20 may vary between IOMs 12 to provide modular support for different access technologies. For example, communication device 10 may include an IOM 12 to support ATM, another IOM 12 to support frame relay, still another IOM 12 to support an internetworking function with an Ethernet local area network (LAN), and any other suitable IOM 12. Communication device 10 contemplates any number and arrangement of IOMs 12 to support different access technologies. Line interface 20 may include one or more components in hardware or software and, in at particular example, includes one or more application specific integrated circuits (ASICs).

Cell flow processor 22 provides an interface between line interface 20 and SCM 14. Unlike line interface 20 which may vary for different access technologies, cell flow processor 22 has the same structure and performs the same function for all IOMs 12. In a particular embodiment, cell flow processor 22 implements a core cell transfer function using ATM with virtual channel (VC) accounting and buffer control. Each cell flow processor 22 includes TSPP 24 for communications into SCM 14 and FSPP 26 for communications from SCM 14. In a particular implementation, TSPP 24 and FSPP 26 comprise an ASIC. Both SCM 14 and redundant SCM 16 may have portions 31 and 33, respectively, that include cell flow processor 22. This allows SCM 14 and redundant SCM 16 to communicate information among components in communication device 10 in the same manner as IOMs 12. Each cell flow processor 22 corresponds to a port or switch port in communication device 10.

Cell flow processors 22 residing on IOMs 12 provide a distributed cell processing architecture that reduces the complexity of SCM 14 and enhances the modularity and scalability of communication device 10. In particular, each IOM 12 added to communication device 10 as an upgrade or to enhance capacity includes its own cell flow processor 22. The on-board cell flow processor 22 of IOMs 12 reduces complexity and cost of entry-level systems, and also establishes a common and consistent interface between IOMs 12 and SCM 14. Therefore, IOMs 12 may be developed for new or evolving access technologies by combining a different structure and function for line interface 20 with the established structure and function for cell flow processor 22 for easy integration into communication device 10.

SCM 14 includes a number of multi-point topology controllers (MTCs) 30, a bandwidth arbiter (BA) 32, and a data crossbar 34, all making up a switch fabric 35. MTC 30 may comprise an ASIC that communicates with a selected number of IOMs 12 and centralizes state information needed for multi-point topology supported by communication device 10. Since IOMs 12 provide access to both connection-based and connectionless environments, MTCs support point-to-point (P2P), multipoint-to-point (M2P), point-to-multipoint (P2M), and multipoint-to-multipoint (M2M) communications. BA 32 accumulates and arbitrates transfer requests from each IOM 12. Specifically, BA 32 directs input/output mapping of data crossbar 34 on a per cell-time basis, dynamically schedules momentarily unused bandwidth of communication device 10, and resolves M2P bandwidth contention. Redundant SCM 16 includes the same components and operates in the same fashion as SCM 14.

One particular technical advantage of communication device 10 is the interconnection between IOMs 12, SCM 14, and redundant SCM 16. Each IOM 12 couples to SCM 14 using interconnect 40 and to redundant SCM 16 using redundant interconnect 42. Both interconnect 40 and redundant interconnect 42 include control interconnect 44 and data interconnect 46, which are dedicated connections since they support communication between SCM 14 and the associated IOM 12. Each portion 30 and 32 of SCM 14 and redundant SCM 16, respectively, may also include interconnect 40 and redundant interconnect 42.

Control interconnect 44 and data interconnect 46 operate serially and, therefore, reduce the connection complexity and size between IOMs 12 and SCM 14 in communication device 10. As described below, the serial operation of control interconnect 44 and data interconnect 46 enhances the modularity and scalability of communication device 10. Control interconnect 44 and data interconnect 46 reduce or eliminate the need for an expensive and complicated common or shared bus architecture in communication device 10. Also, the reduced number of lines in control interconnect 44 and data interconnect 46 simplifies fault isolation. For example, information communicated on these serial lines may include one or more parity bits to quickly and efficiently identify faulty components in communication device 10.

Figure 2:
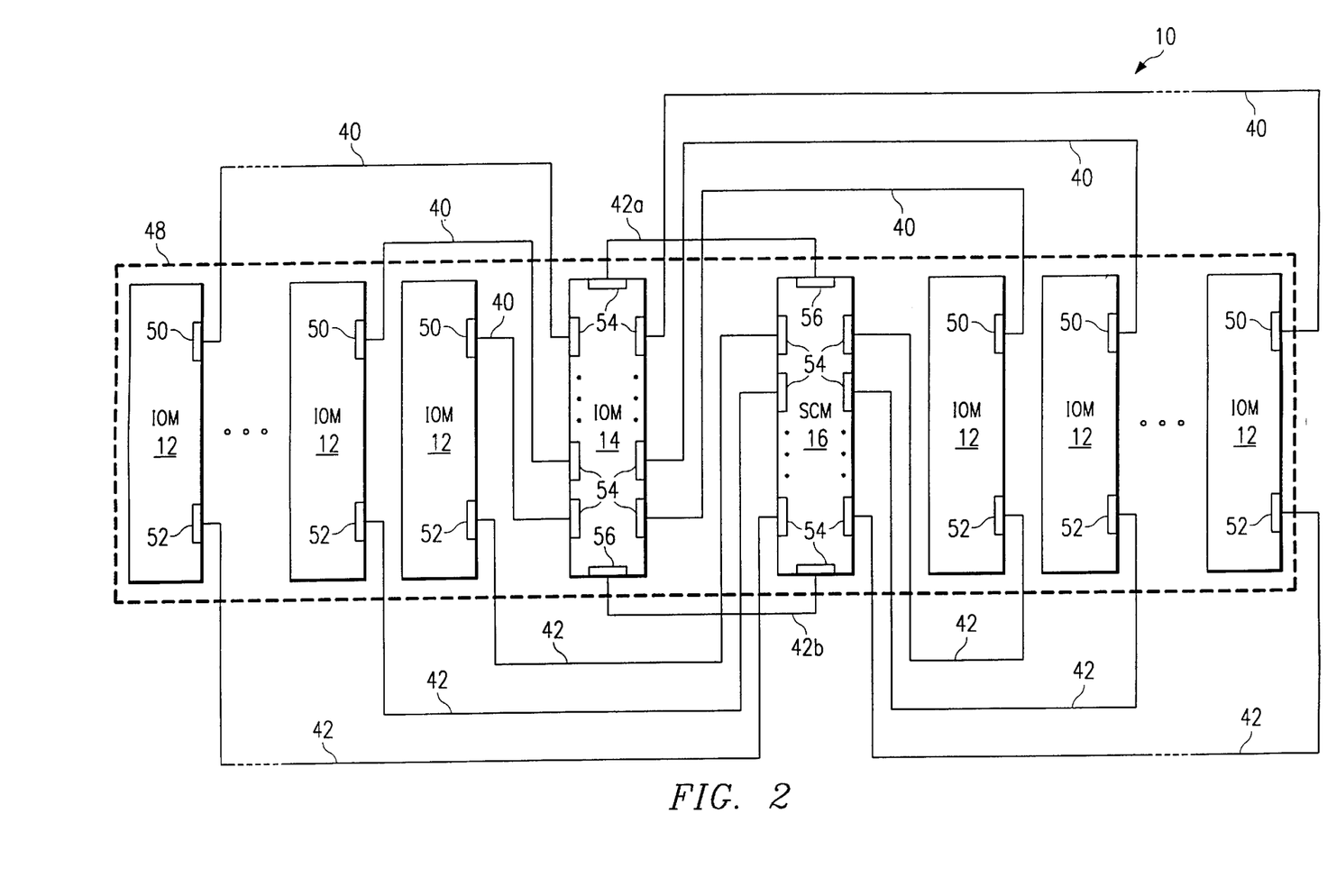
FIG. 2 illustrates the connectivity scheme among components of the communication device.

FIG. 2 illustrates a connectivity scheme used by communication device 10. This connectivity scheme represents the interconnections established by a backplane 48 or other similar device in the chassis or support structure of communication device 10. IOMs 12, SCM 14, and redundant SCM 16 may be integrated circuit boards that plug into slots in backplane 48 to effect the connectivity scheme. Backplane 48 or other similar device implements the specified connections between components in communication device 10 to establish interconnects 40 and redundant interconnects 42.

Each IOM 12 includes a connector region 50 and a redundant connector region 52. SCM 14 and redundant SCM 16 include connector regions 54 and redundant connector regions 56. Connector regions 50, 52, 54, and 56 represent a collection of contiguous or non-contiguous pins, conductors, or other matings on components in communication device 10.

Connector region 50 of each IOM 12 is coupled to and has a one-to-one correspondence with an associated connector region 54 on SCM 14 to establish interconnect 40. Likewise, redundant connection region 52 of each IOM 12 is coupled to and has a one-to-one correspondence with an associated connection region 54 of redundant. SCM 16 to establish redundant interconnect 42. Therefore, each interconnect 40 establishes a dedicated communication path or link between an associated IOM 12 and SCM 14, and each redundant interconnect 42 establishes a dedicated communication path or link between an associated IOM 12 and redundant SCM 16. Throughout this description, interconnect 40, redundant interconnect 42, control interconnect 44, and data interconnect 46 may represent connection regions, lines, pins, conductors, matings, connectors, or any combination of these elements to accomplish a coupling between components in communication device 10. Referring to FIGS. 1 and 2, since SCM portions 31, 33 may each include a cell flow processor 22, the connectivity scheme includes two additional redundant interconnects 42a and 42b. In particular, cell flow processor 22 on portion 32 of redundant SCM 16 is coupled to a corresponding connection region 54 on SCM 14 using redundant connection region 56 on redundant SCM 16 to establish redundant interconnect 42a. Likewise, cell flow processor 22 on portion 30 of SCM 14 is coupled to a corresponding connection region 54 on redundant SCM 16 using redundant connection region 56 on SCM 14 to establish redundant interconnect 42b.

The connectivity scheme illustrated in FIG. 2 provides several advantages to communication device 10. SCM 14 and redundant SCM 16 may include many connection regions 54 that support a number of existing or potential IOMs 12. However, each IOM 12 maintains one connection region 50 and one redundant connection region 52 to establish interconnect 40 and redundant interconnect 42, respectively, which reduces the cost and complexity of backplane 48. This dedicated connection approach instead of a common or shared bus approach improves modularity and scalability. In particular, an entry-level communication device 10 may include SCM 14 and eight IOMs 12, but with a backplane 48 of reduced complexity and size that still accommodates future upgrades and additions. Depending upon its requirements and demands, a user of communication device 10 may add redundant SCM 16 to enhance reliability or add more IOMs 12 to improve capacity or support a different access technology.

Figure 3:
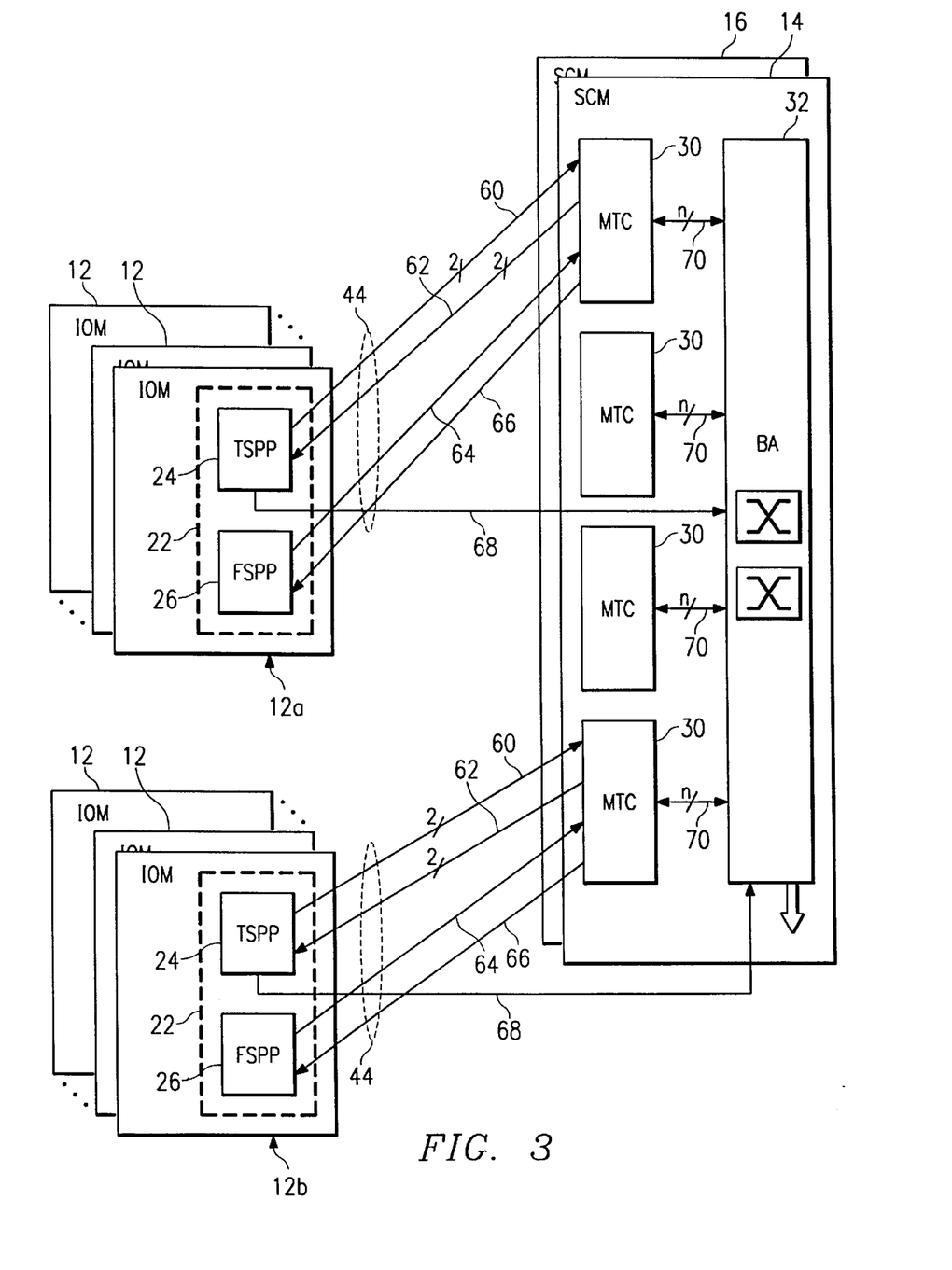
FIG. 3 illustrates in more detail a control interconnect between components in the communication device.

FIG. 3 illustrates in more detail control interconnect 44 between IOMs 12 and SCM 14. A similar control interconnect 44 exists between IOMs 12 and redundant SCM 16. Each control interconnect 44 includes two lines, conductors, couplings, connectors, matings, or connections (referred to generally as lines) between TSPP 24 of IOM 12 and an associated MTC 30 of SCM 14: a line from TSPP 24 to MTC 30 (T2M) 60 and a line from MTC 30 to TSPP 24 (M2T) 62. Control interconnect 44 also includes two lines between FSPP 26 and MTC 30: a line from FSPP 26 to MTC 30 (F2T) 64 and a line from MTC 30 to FSPP 26 (M2F) 66. Also, control interconnect 44 includes a line from TSPP 24 to BA 32 (T2B) 68. In a particular implementation, T2M 60 and M2T 62 comprise two lines each, whereas F2M 64, M2F 66, and T2B 68 comprise one line each. Thierefore, in this particular embodiment, control interconnect 44 comprises seven lines between IOM 12 and SCM 14. Another seven lines from IOM 12 may establish a similar control interconnect 44 with redundant SCM 16.

Each MTC 30 may support several IOMs 12. In a particular implementation, each MTC 30 supports four IOMs, resulting in twenty-four lines to implement four control interconnects 44. MTC 30 communicates with EBA 32 using control line 70. Control line 70 comprises sixteen lines from MTC 30 to BA 32 and nine lines from BA 32 to MTC 30. In a system that includes sixteen IOMs 12 and four MTCs 20, BA 32 receives and transmits control information relating to the operation of communication device 10 on eighty input lines (twenty-four lines for each control line 70 and one line for each T2B 68) and four output lines (one line for each control line 70).

In operation, communication device 10 using control interconnect 44 manages communications between receive IOM 12*a* and transmit IOM 12*b*. For a P2P cell transfer, line interface 20 receives information in the format or protocol used by the access technology supported by IOM 12*a*. Line interface 20 translates this information into the core cell transfer format supported by cell flow processor 22. TSPP 24 receives the cell and generates a request for communication over T2B 68 for a designated output port. BA 32 grants the request and communicates the grant to TSPP 24 using control line 70, MTC 30, and M2T 62.

MTC 30 then performs any necessary translation to identify the virtual channel (VC) queue associated with transmit IOM 12*b*. Each TSPP 24 transmits a scheduling list number to the MTC 30 on the T2M line 60. The scheduling list number reflects the connection it is transferring a cell from. The MTC 30 uses this information to determine the output port(s) and multiQueue number(s) to which the cell will be transferred. The MTC 30 passes this information to the BA 32 on the M2B lines 70, and the BA 32 passes the multiQueue number to the MTC(s) on the B2M lines 70. The MTC 30 further passes the multiQueue number(s) to the FSPP(s) 26 using the M2F line 66. The FSPP 26 uses multiQueue number to determine which output queue(s) are to receive the cell and whether these queues are full. Flow control information, based on the queue status is communicated in the reverse direction, i.e. F2M 64, followed by M2B 70, followed by B2M 70, and lastly M2T 62. This control information happens in parallel for all port processors, and control flow is capable of multipoint transfers.

Figure 4:
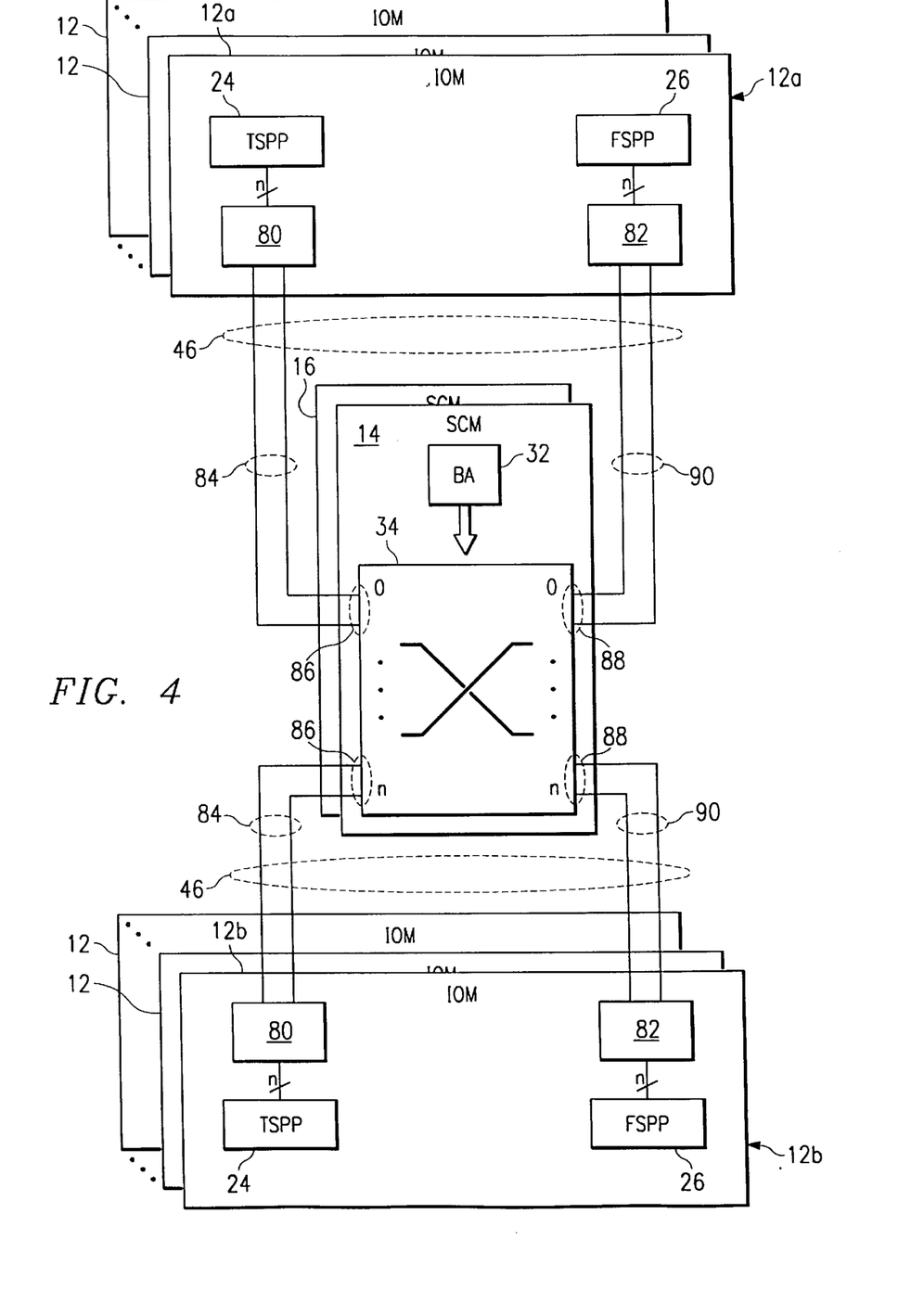
FIG. 4 illustrates in more detail a data interconnect between components in the communication device.

FIG. 4 illustrates in more detail data interconnect 46 that transfers the cell after establishing the appropriate control information using control interconnect 44. Shown in more detail in IOM 12 is TSPP 24: coupled to a serializer 80 and FSPP 26 coupled to a deserializer 82. In a particular embodiment, serializer 80 and deserializer 82 support a fiber channel high speed serial. interface. Serializer 80 converts an n-bit word received from TSPP 24 into a differential emitter coupled logic (ECL) signal for transmission over transmit line pair 84. Transmit line pair 84 is coupled to input port 86 of data crossbar 34. Output port 88 of data crossbar 34 is coupled to a differential ECL receive line pair 90, which in turn is coupled to deserializer 82 in IOM 12. Deserializer 82 converts information received over receive line pair 90 into an n-bit word for delivery to FSPP 26.

In this embodiment, data crossbar 34 includes input port 86 and an associated output port 88 for each IOM 12 coupled to SCM 14. Input port 86 and output port 88 each comprise a line pair connection. Data crossbar 34 may be an ECL cross-point device under the control of BA 32. Upon receiving the appropriate control information established using control interconnect 44, BA 32 configures data crossbar 34 to achieve the proper cell transfer. Data crossbar 34 maps one input port 86 to one or more output ports 88. For example, data crossbar 34 may establish a connection between input port 86 associated with IOM 12*a* and output port 88 associated with IOM 12*b*. In another example, data crossbar 34 may establish a connection between input port 86 and output port 88 associated with the same IOM 12.

In a particular implementation, TSPP 24 and FSPP 26 on IOM 12 operate using a fifty MHZ system clock. Data is transferred in a twenty bit word to serializer 80 and converted into a one GHz differential ECL signal for transfer over transmit line pair 84 to data crossbar 34. Data crossbar 34 simultaneously supports sixteen ports or IOMs 12, and additional data crossbars 34 may be added to increase the capacity of SCM 14. Data crossbar 34 performs high speed switching between input ports 86 and associated output ports 88 under the direction of BA 32. Receive line pair 90 communicates information from output port 88 to deserializer 82, which converts the one GHz differential ECL signal into a twenty bit digital word at fifty MHZ for presentation to FSPP 26.

To accommodate high bandwidth traffic, transmit line pair 84 and receive line pair 90 of data interconnect 46 are high speed serial links. With increased data rates of one GHz or more, communication device 10 may experience a clock skew problem caused by communication delays in transmit line pair 84 and receive line pair 90. Therefore, communication device 10, and specifically deserializer 82, employs a phase lock loop and resynchronizer to account for clock skew over data interconnect 46.

Figure 5:
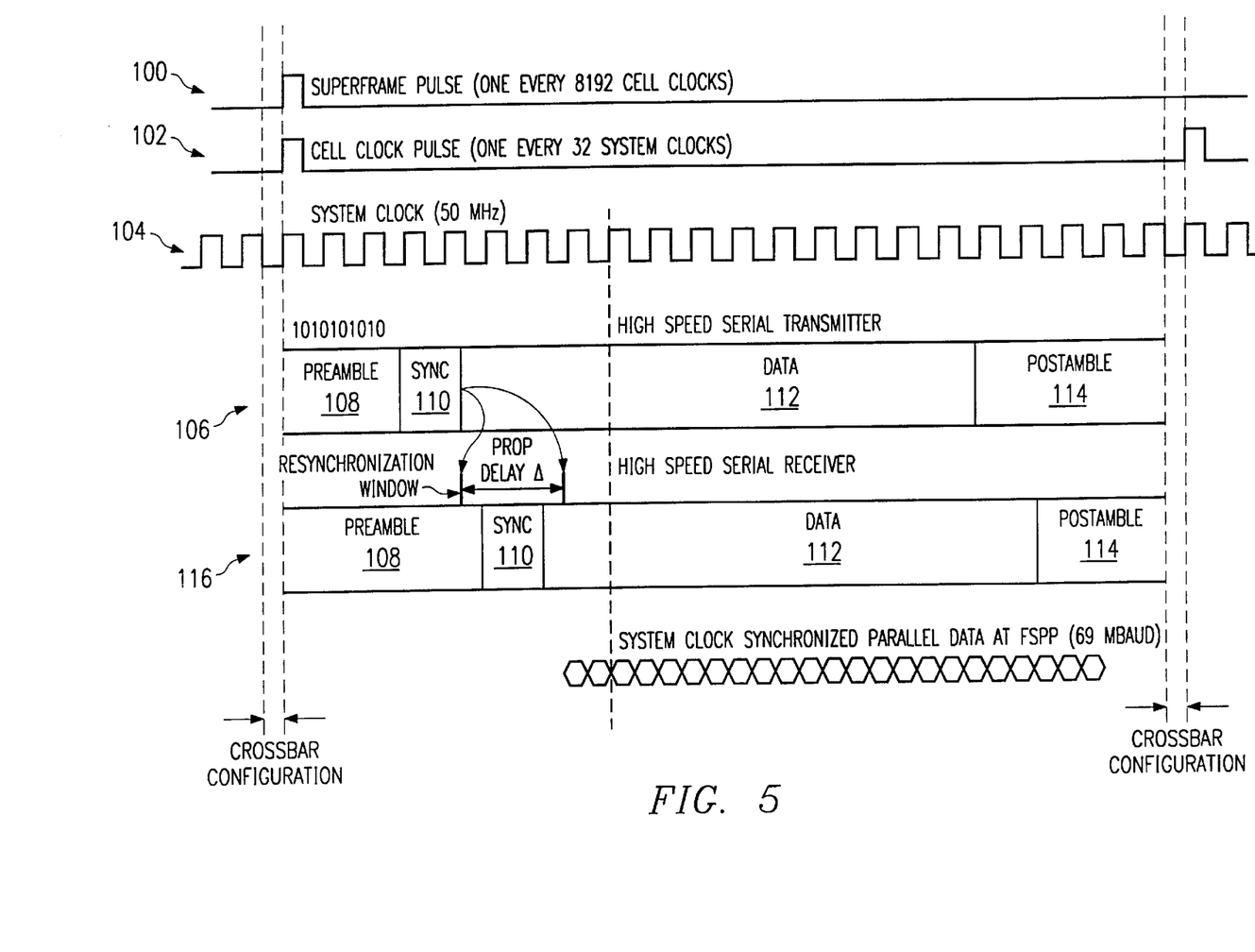
FIG. 5 illustrates a timing diagram for communications using the data interconnect.

FIG. 5 illustrates a timing diagram for transfer of a cell from TSPP 24 TO FSPP 26 using data interconnect 46. A cell clock pulse 102 occurs every thirty-two cycles of system clock 104 which, in a particular implementation, operates at fifty MHZ. Each cell clock pulse 102 represents a single cell transfer and receive event using data interconnect 46.

A signal 106 generated by serializer 80 for transmission over transmit line pair 84 begins with a preamble 108 which, in a particular embodiment., comprises a serial bit stream of alternating "1s" and "0s." A phase lock loop in deserializer 82 establishes synchronization with the one GHz signal using preamble 108. After preamble 108, serializer 80 generates a sync 110 that indicates the beginning of data 112. Serializer 80 concludes the transmission during cell clock pulse 102 with a postamble 114 that, like preamble 108, includes a serial bit stream of alternating "1s" and "0s" to allow synchronization by deserializer 82.

Deserializer 82 receives a signal 116, which includes preamble 108, sync 110, data 112, and postamble 114. A sufficient length of postamble 114 from the previous cell and preamble 108 from the current cell before sync 110 ensures that deserializer 82 is in sync with the one GHz signal and ready to receive data 112. Between cells, BA 32 reconfigures data crossbar 34 to deliver the next cell of information.

Although the present invention has been described in several embodiments, a myriad of changes, variations, alterations, transformations, and modifications may be suggested to one skilled in the art, and it is intended that the present invention encompass such changes, variations, alterations, transformations, and modifications as fall within the spirit and scope of the appended claims.

What is claimed is:

1. A communication device comprising:

a switch control module having a switch fabric;

a plurality of input/output modules operable to receive and transfer information under control of the switch control module, each input/output module having a cell flow processor;

a plurality of dedicated control interconnects, each control interconnect operable to couple a cell flow processor of an input/output module to the switch fabric of the switch control module; and a plurality of dedicated data interconnects, each data interconnect operable to couple a cell flow processor of an input/output module to the switch fabric of the switch control module, wherein the switch control module includes a plurality of multipoint topology controllers coupled to a bandwidth arbiter, each multipoint topology controller operable to couple to at least one cell flow processor of an input/output module in order to support point and multipoint to point communications, the bandwidth arbiter operable to control mapping of the switch fabric to support communications among the input/output modules and the multipoint topology controllers.

2. The device of claim 1, wherein the switch control module further comprises a cell flow processor, wherein the cell flow processor of the switch control module is coupled to a bandwidth arbiter of the switch control module, the bandwidth arbiter operable to control mapping of the switch fabric to support communications among the cell flow processor of the switch control module and the cell flow processors of the input/output modules.

3. The device of claim 1, further comprising:

a redundant switch control module having a switch fabric;

a plurality of redundant control interconnects, each redundant control interconnect operable to couple a cell flow processor of an input/output module to the switch fabric of the redundant switch control module; and a plurality of redundant data interconnects, each redundant data interconnect operable to couple a cell flow processor of an input/output module to the switch fabric of the redundant switch control module.

4. The device of claim 1, wherein each cell flow processor further comprises:

a to-switch port processor; and a from-switch port processor.

5. The device of claim 4, wherein each data interconnect comprises:

two lines operable to couple the to-switch port processor of the input/output module to the switch fabric of the switch control module; and two lines operable to couple the from-switch port processor of the input/output module to the switch fabric of the switch control module.

6. The device of claim 4, wherein each data interconnect comprises:

two differential emitter coupled logic lines operable to couple the to-switch port processor of the input/output module to the switch fabric of the switch control module; and two differential emitter coupled logic lines operable to couple the from-switch port processor of the input/output module to the switch fabric of the switch control module.

7. The device of claim 4, wherein the switch control module further comprises a plurality of multipoint topology controllers coupled to a bandwidth arbiter, each multipoint topology controller operable to couple to at least one cell flow processor of an input/output module in order to support point and multipoint to point and multipoint communications, the bandwidth arbiter operable to control mapping of the switch fabric to support communications among the input/output modules and the multipoint topology controllers, each control interconnect comprising:

four lines operable to couple the to-switch port processor of the input/output module to an associated multipoint topology controller of the switch control module;

two lines operable to couple the from-switch port processor of the input/output module to the associated multipoint topology controller of the switch control module; and one line operable to couple the to-switch port processor of the input/output module to the bandwidth arbiter of the switch control module.

8. A communication device comprising:

a switch control module having a switch fabric and a plurality of first connector regions;

a plurality of input/output modules, each input/output module having a second connector region coupled to a cell flow processor, each second connector region coupled to and having one-to-one correspondence with a first connector region of the switch control module, said switch control module connected to each respective input/output module by separate control and data interconnects; and a redundant switch control module having a switch fabric and a plurality of third connector regions, each input/output module having a fourth connector region coupled to the cell flow processor, each fourth connector region coupled to and having a one-to-one correspondence with a third connector region of the redundant switch control module, wherein the switch control module further comprises a fifth connector region coupled to a cell flow processor of the switch control module, the fifth connector region coupled to and having a one-to-one correspondence with a third connector region of the redundant switch control module.

9. The device of claim 8, further comprising a backplane having a plurality of interconnects, each interconnect operable to couple a first connector region to a corresponding second connector region, each interconnect comprising a data interconnect and a control interconnect.

10. The device of claim 9, wherein each cell flow processor further comprises a to-switch port processor and a from-switch port processor, each data interconnect comprises:

two lines operable to couple the to-switch port processor of the input/output module to the switch fabric of the switch control module; and two lines operable to couple the from-switch port processor of the input/output module to the switch fabric of the switch control module.

11. The device of claim 9, wherein each cell flow processor further comprises a to-switch port processor and a from-switch port processor, each data interconnect comprises:

two differential emitter coupled logic lines operable to couple the to-switch port processor of the input/output module to the switch fabric of the switch control module; and two differential emitter coupled logic lines operable to couple the from-switch port processor of the input/output module to the switch fabric of the switch control module.

12. The device of claim 9, wherein each cell flow processor further comprises a to-switch port processor and a from-switch port processor, wherein the switch control module further comprises a plurality of multipoint topology controllers coupled to a bandwidth arbiter, each multipoint topology controller coupled to at least one cell flow processor of an input/output module in order to support point and multipoint to point and multipoint communications, the bandwidth arbiter operable to control mapping of the switch fabric to support communications among the input/output modules and the multipoint topology controllers, each control interconnect comprising:

four lines operable to couple the to-switch port processor of the input/output module to an associated multipoint topology controller of the switch control module;

two lines operable to couple the from-switch port processor of the input/output module to the associated multipoint topology controller of the switch control module; and one line operable to couple the to-switch port processor of the input/output module to the bandwidth arbiter of the switch control module.

13. An input/output module operable to couple to a switch control module having a switch fabric, the input/output module comprising:

a line interface operable to receive and transfer information;

a to-switch port processor operable to process information received at the line interface;

a from-switch port processor operable to process information to be transferred by the line interface;

a data interconnect coupled to the to-switch processor and the from-switch processor, the data interconnect operable to couple to the switch fabric of the switch control module;

a control interconnect coupled to the to-switch port processor and the from-switch port processor, the control interconnect operable to couple to the switch fabric of the switch control module; and wherein the data interconnect includes two lines operable to couple the to-switch port processor of the input/output module to the switch fabric of the switch control module, and two lines operable to couple the from-switch port processor of the input/output module to the switch fabric of the switch control module.

14. The input/output module of claim 13, wherein the line interface comprises a physical interface, a network interworking interface, and a connectivity engine.

15. The input/output module of claim 13, wherein the line interface is operable to convert information received from an access technology into a core cell transfer format.

16. The input/output module of claim 15, wherein the access technology comprises frame relay.

17. The input/output module of claim 15, wherein the access technology comprises asynchronous transfer mode.

18. The input/output module of claim 15, wherein the core cell transfer format comprises asynchronous transfer mode.

19. The input/output module of claim 13, wherein:

the two lines operable to couple the to-switch port processor of the input/output module to the switch fabric of the switch control module comprise two differential emitter coupled logic lines; and the two lines operable to couple the from-switch port processor of the input/output module to the switch fabric of the switch control module comprise two differential emitter coupled logic lines.

20. The input/output module of claim 13, wherein the switch control module further comprises a plurality of multipoint topology controllers coupled to a bandwidth arbiter, each multipoint topology controller operable to couple to the to-switch port processor and the from-switch port processor in order to support point and multipoint to point and multipoint communications, the bandwidth arbiter operable to control mapping of the switch fabric to support communications among the multipoint topology controllers, the to-switch port processor, and the from-switch port processor, the control interconnect comprising:

four lines operable to couple the to-switch port processor of the input/output module to an associated multipoint topology controller of the switch control module;

two lines operable to couple the from-switch port processor of the input/output module to an associated multipoint topology controller of the switch control module; and one line operable to couple the to-switch port processor of the input/output module to the bandwidth arbiter of the switch control module.

21. The input/output module of claim 13, further comprising:

a redundant data interconnect coupled to the to-switch port processor and the from-switch port processor, the redundant data interconnect operable to couple to a switch fabric of a redundant switch control module; and a redundant control interconnect coupled to the to-switch port processor and the from-switch port processor, the redundant control interconnect operable to couple to a bandwidth arbiter of a redundant switch control module.

22. The input/output module of claim 21, wherein the redundant data interconnect comprises:

two lines operable to couple the to-switch port processor of the input/output module to the switch fabric of the redundant switch control module; and two lines operable to couple the from-switch port processor of the input/output module to the switch fabric of the redundant switch control module.

23. The input/output module of claim 21, wherein the redundant data interconnect comprises:
two differential emitter coupled logic lines operable to couple the to-switch port processor of the input/output module to the switch fabric of the redundant switch control module; and
two differential emitter coupled logic lines operable to couple the from-switch port processor of the input/output module to the switch fabric of the redundant switch control module.

24. The input/output module of claim 21, wherein the redundant switch control module further comprises a plurality of multipoint topology controllers coupled to the bandwidth arbiter of the redundant switch control module, each multipoint topology controller operable to couple to at least one input/output module, the redundant control interconnect comprising:
four lines operable to couple the to-switch port processor of the input/output module to an associated multipoint topology controller of the redundant switch control module;
two lines operable to couple the from-switch port processor of the input/output module to this associated multipoint topology controller of the redundant switch control module; and
one line operable to couple the to-switch port processor of the input/output module to the bandwidth arbiter of the redundant switch control module.

25. An input/output module operable to couple to a switch control module having a switch fabric, the input/output module comprising:
a cell flow processor operable to receive and transfer information;
a data interconnect coupled to the cell flow processor, the data interconnect operable to couple to the switch fabric of the switch control module;
a control interconnect coupled to the cell flow processor, the control interconnect operable to couple to the switch fabric; and
wherein the data interconnect includes two lines operable to couple a to-switch port processor of the input/output module to the switch fabric of the switch control module, and two lines operable to couple a from-switch port processor of the input/output module to the switch fabric of the switch control module.

26. The input/output module of claim 25, further comprising:
a redundant data interconnect coupled to the cell flow processor, the redundant data interconnect operable to couple to a switch fabric of a redundant switch control module; and
a redundant control interconnect coupled to the cell flow processor, the redundant data interconnect operable to couple to a switch fabric of a redundant switch control module.

27. The input/output module of claim 25, further comprising a line interface.

28. The input/output module of claim 27, wherein the line interface is operable to convert information received from an access technology into a core cell transfer format.

29. The input/output module of claim 27, wherein the access technology comprises frame relay.

30. The input/output module of claim 27, wherein the access technology comprises asynchronous transfer mode.

31. The input/output module of claim 27, wherein the core cell transfer format comprises asynchronous transfer mode.

32. The input/output module of claim 25, further comprising a line interface having a physical interface, a network interworking interface, and a connectivity engine.

33. A switch control module operable to couple to a plurality of input/output modules, the switch control module comprising:
a data crossbar operable to transfer information from a first crossbar input to any of a plurality of crossbar outputs;
a bandwidth arbiter operable to control mapping of the data crossbar;
a plurality of data interconnects coupled to the data crossbar, each data interconnect operable to couple to a corresponding input/output module;
a plurality of control interconnects coupled to the bandwidth arbiter, each control interconnect operable to couple to a corresponding input/output module, wherein each input/output module includes a to-switch port processor and a from-switch port processor; and
wherein each data interconnect comprises:
two lines coupled to the data crossbar of the switch control module, the two lines operable to couple to the to-switch port processor of the corresponding input/output module; and
two lines coupled to the data crossbar of the switch control module, the two lines operable to couple to the from-switch port processor of the corresponding input/output module.

34. The switch control module of claim 33, wherein each input/output module comprises a to-switch port processor and a from-switch port processor, each data interconnect comprises:
two differential emitter coupled logic lines coupled to the data crossbar of the switch control module, the two lines operable to couple to the to-switch port processor of the corresponding input/output module; and
two differential emitter coupled logic lines coupled to the data crossbar of the switch control module, the two lines operable to couple to the from-switch port processor of the corresponding input/output module.

35. The switch control module of claim 33, further comprising a plurality of multipoint topology controllers coupled to a bandwidth arbiter each multipoint topology controller operable to support point and multipoint to point and multipoint communications among the plurality of input/output modules, the bandwidth arbiter operable to control mapping of the data crossbar to support communications among the multipoint topology controllers and the input/output modules, each control interconnect comprises:
four lines operable to couple the to-switch port processor of the corresponding input/output module to an associated multipoint topology controller of the switch control module;
two lines operable to couple the from-switch port processor of the corresponding input/output module to the associated multipoint topology controller of the switch control module; and
one line operable to couple the to-switch port processor of the corresponding input/output module to the bandwidth arbiter of the switch control module.

36. The switch control module of claim 33, further comprising:
a to-switch port processor operable to receive information from any of the plurality of input/output modules;
a from-switch port processor operable to provide information to any of the plurality of input/output modules;

a redundant data interconnect coupled to the to-switch port processor and the from-switch port processor, the redundant data interconnect operable to couple to a data crossbar of a redundant switch control module; and a redundant control interconnect coupled to the to-switch port processor and the from-switch port processor, the redundant control interconnect operable to couple to a bandwidth arbiter of the redundant switch control module.

37. The switch control module of claim 36, wherein the redundant data interconnect comprises:

two lines operable to couple the to-switch port processor of the switch control module to the data crossbar of the redundant switch control module; and two lines operable to couple the from-switch port processor of the switch control module to the data crossbar of the redundant switch control module.

38. The switch control module of claim 36, wherein the redundant data interconnect comprises:

two differential emitter coupled logic lines operable to couple the to-switch port processor of the switch control module to the data crossbar of the redundant switch control module; and two differential emitter coupled logic lines operable to couple the from-switch port processor of the switch control module to the data crossbar of the redundant switch control module.

39. The switch control module of claim 36, wherein the redundant switch control module further comprises a plurality of multipoint topology controllers coupled to a bandwidth arbiter of the redundant control module, the redundant control interconnect comprising:

four lines operable to couple the to-switch port processor of the input/output module to an associated multipoint topology controller of the redundant switch control module;

two lines operable to couple the from-switch port processor of the input/output module to the associated multipoint topology controller of the redundant switch control module; and one line operable to couple the to-switch port processor of the input/output module to the bandwidth arbiter of the redundant switch control module.

40. An input/output module operable to couple to a switch control module having a switch fabric, the input/output module comprising:

a to-switch port processor;

a from-switch port processor;

a line interface coupled to the to-switch port processor and the from-switch port processor, the line interface operable to convert information received from an access technology into a core cell transfer format for delivery to the to-switch port processor, the line interface further operable to convert information in a core cell transfer format received from the from-switch port processor into a format for the access technology;

a data interconnect coupled to the to-switch processor and the from-switch processor, the data interconnect comprising two differential emitter coupled logic lines operable to couple the to-switch port processor of the input/output module to the switch fabric of the switch control module, the data interconnect further comprising two differential emitter coupled logic lines operable to couple the from-switch port processor of the input/ output module to the switch fabric of the switch control module; and a control interconnect coupled to the to-switch port processor and the from-switch port processor, the control interconnect comprising four lines operable to couple the to-switch port processor of the input/output module to a multipoint topology controller in the switch fabric of the switch control module, the control interconnect further comprising two lines operable to couple the from-switch port processor of the input/output module to the multipoint topology controller of the switch control module, the control interconnect further comprising one line operable to couple the to-switch port process of the input/output module to a bandwidth arbiter in the switch fabric of the switch control module.

41. The input/output module of claim 40, wherein the line interface comprises a physical interface, a network interworking interface, and a connectivity engine.

42. The input/output module of claim 40, wherein the access technology comprises frame relay.

43. The input/output module of claim 40, wherein the access technology comprises asynchronous transfer mode.

44. The input/output module of claim 40, wherein the core cell transfer format comprises asynchronous transfer mode.

45. The input/output module of claim 40, further comprising:

a serializer coupled to the to-switch port processor, the serializer operable to convert an n-bit word received from the to-switch port processor into serial data for transmission using the data interconnect; and a deserializer coupled to the from-switch port processor, the deserializer operable to convert the serial data received from the data interconnect into an n-bit word for delivery to the from-switch port processor.

46. The input/output module of claim 40, further comprising:

a redundant data interconnect coupled to the to-switch port processor and the from-switch port processor, the redundant data interconnect comprising two differential emitter coupled logic lines operable to couple the to-switch port processor of the input/output module to a switch fabric of a redundant switch control module, the redundant data interconnect further comprising two differential emitter coupled logic lines operable to couple the from-switch port processor of the input/ output module to the switch fabric of the redundant switch control module; and a redundant control interconnect coupled to the to-switch port processor and the from-switch port processor, the redundant control interconnect comprising four lines operable to couple the to-switch port processor of the input/output module to a multipoint topology controller in the switch fabric of the redundant switch control module, the control interconnect further comprising two lines operable to couple the from-switch port processor of the input/output module to the multipoint topology controller of the redundant switch control module, the control interconnect further comprising one line operable to couple the to-switch port processor of the input/output module to a bandwidth arbiter in the switch fabric of the redundant switch control module.

47. A communication device, comprising:

a switch control module having a switch fabric;

a plurality of input/output modules operable to receive and transfer information;

a plurality of serial control interconnects, each said serial control interconnect operable to couple a respective one of said plurality of input/output modules to said switch control module; and a plurality of serial data interconnects, each said serial data interconnect operable to couple a respective one of said plurality of input/output modules to said switch control module.

48. The communication device of claim 47, wherein each of said plurality of serial data interconnects includes a receive line pair and a transmit line pair.

49. The communication device of claim 47, wherein said serial data interconnect communicates at least one serial bit stream.

50. The communication device of claim 47, wherein said serial control interface communicates at least one serial bit stream.

51. The communication device of claim 47, each of said input/output modules further comprising:

a serializer for converting an n-bit data word received from a port processor into a serial bit stream for transmission over said serial data interconnect.

52. The communications device of claim 47, each of said input/output modules further comprising:

a deserializer for converting a bit stream received from said serial data interconnect into an n-bit data word for presentation to a port processor.

53. The communications device of claim 47, wherein said serial control interconnect conveys flow control information.

54. The communications device of claim 47, wherein said serial control interconnect conveys bandwidth requests and grants.

55. The communications device of claim 47, wherein said serial control interconnect conveys queue numbers.

56. An input/output module operable to couple to a switch control module having a switch fabric, the input/output module comprising:

a line interface operable to receive and transmit information;

a serial control interconnect, said serial control interconnect operable to couple said input/output module to said switch control module; and a serial data interconnect, said serial data interconnect operable to couple said input/output module to said switch control module.

57. The input/output module of claim 56, wherein said serial data interconnect includes a receive line pair and a transmit line pair.

58. The input/output module of claim 56, wherein said serial data interconnect communicates at least one serial bit stream.

59. The input/output module of claim 56, wherein said serial control interface communicates at least one serial bit stream.

60. The input/output module of claim 56, further comprising:

a serializer for converting an n-bit data word received from a port processor into a serial bit stream for transmission over said serial data interconnect.

61. The input/output module of claim 56, further comprising:

a deserializer for converting a bit stream received from said serial data interconnect into an n-bit data word for presentation to a port processor.

62. The input/output module of claim 56, wherein said serial control interconnect conveys flow control information.

63. The input/output module of claim 56, wherein said serial control interconnect conveys bandwidth requests and grants.

64. The input/output module of claim 56, wherein said serial control interconnect conveys queue numbers.

65. A switch control module having a switch fabric, said switch control module operable to couple to a plurality of input/output modules, said plurality of input/output modules operable to receive and transfer information, said switch control module comprising;

a plurality of serial control interconnects, each said serial control interconnect operable to couple a respective one of said plurality of input/output modules to said switch control module; and a plurality of serial data interconnects, each said serial data interconnect operable to couple a respective one of said plurality of input/output modules to said switch control module.

66. The switch control module of claim 65, wherein each of said plurality of serial data interconnects includes a receive line pair and a transmit line pair.

67. The switch control module of claim 65, wherein said serial data interconnect is operable to communicate at least one serial bit stream.

68. The switch control module of claim 65, wherein said serial control interface is operable to communicate at least one serial bit stream.

69. The switch control module of claim 65, wherein said serial control interconnect is operable to convey flow control information.

70. The switch control module of claim 65, wherein said serial control interconnect is operable to convey bandwidth requests and grants.

71. The switch control module of claim 65, wherein said serial control interconnect is operable to convey queue numbers.

72. A method of transferring data and control signals in a communication device, said communication device including a plurality of input/output modules and a switch control module having a switching fabric, comprising:

receiving a plurality of serial bit streams of control information by said switch control module from respective ones of said plurality of input/output modules; and receiving a plurality of serial bit streams of data information by said switch control module from respective ones of said plurality of input/output modules.

73. The method of claim 72, further comprising converting at least one n-bit data word received from a port processor into one of said serial bit streams.

74. The method of claim 72, wherein said serial bit streams of control information convey flow control information.

75. The method of claim 72, wherein said serial bit streams of control information convey bandwidth requests and grants.

76. The method of claim 72, wherein said serial bit streams of control information convey queue numbers.

77. A system for interconnecting a plurality of input/output modules, a switch control module, and a redundant switch control module, comprising:

a first plurality of serial interconnects operable to transfer information between respective ones of said plurality of input/output modules and said switch control module; and a second plurality of serial interconnects operable to transfer information between respective ones of said plurality of input/output modules and said redundant switch control module; and a redundant interconnect operable to transfer information between a cell flow processor on said switch control module and a switch fabric of said redundant switch control module.

78. The system of claim 77, further comprising a second redundant interconnect operable to transfer data units between a cell processor on said redundant switch control module and a switch fabric of said switch control module.

79. The system of claim 77, wherein said cell flow processor on said switch control module communicates over said redundant interconnect in substantially the same manner as one of said plurality of input/output modules.

80. The system of claim 77, wherein said cell flow processor on said redundant switch control module communicates over said second redundant interconnect in substantially the same manner as one of said plurality of input/output modules.

* * * * *

UNITED STATES PATENT AND TRADEMARK OFFICE
CERTIFICATE OF CORRECTION

PATENT NO. : 5,983,260
DATED : November 9, 1999
INVENTOR(S) : Stephen A. Hauser et al.

It is certified that error appears in the above-identified patent and that said Letters Patent is hereby corrected as shown below:

Column 3,
Line 2, "at" should read -- a --;

Column 5,
Line 24, "Thierefore," should read -- Therefore, --;
Line 32, "EBA 32" should read -- BA 32 --;

Column 6,
Line 8, "24:" should read -- 24 --;
Line 11, "serial.interface." should read -- serial interface. --;
Line 65, "embodiment.," should read -- embodiment, --; and Column 11,
Line 23, "this" should read -- the --.

Signed and Sealed this

Second Day of April, 2002

Attest:

JAMES E. ROGAN
Attesting Officer       Director of the United States Patent and Trademark Office